(12) United States Patent
Lee et al.

(10) Patent No.: US 9,501,190 B2
(45) Date of Patent: Nov. 22, 2016

(54) TOUCH WINDOW

(71) Applicant: LG INNOTEK CO., LTD., Seoul (KR)

(72) Inventors: Byoung Ryul Lee, Seoul (KR); Jae Heung Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 67 days.

(21) Appl. No.: 14/466,462

(22) Filed: Aug. 22, 2014

(65) Prior Publication Data

US 2015/0077652 A1 Mar. 19, 2015

(30) Foreign Application Priority Data

Sep. 16, 2013 (KR) ........................ 10-2013-0111413

(51) Int. Cl.
*G06F 3/044* (2006.01)

(52) U.S. Cl.
CPC ..... *G06F 3/044* (2013.01); *G06F 2203/04107* (2013.01)

(58) Field of Classification Search
CPC ................ G06F 2203/04107; G06F 3/044
USPC ........................................................ 345/173
See application file for complete search history.

(56) References Cited

U.S. PATENT DOCUMENTS

| 6,093,477 | A | * | 7/2000 | Matsufusa | ............... | G06F 3/044 178/18.03 |
| 2002/0171634 | A1 | * | 11/2002 | Matsufusa | ............... | G06F 3/044 345/173 |
| 2003/0052867 | A1 | * | 3/2003 | Shigetaka | ............... | G06F 3/044 345/173 |
| 2003/0203543 | A1 | * | 10/2003 | Tanabe | ............... | G06K 9/00053 438/118 |
| 2004/0256147 | A1 | * | 12/2004 | Shigetaka | ............... | G06F 3/044 174/254 |
| 2005/0237439 | A1 | * | 10/2005 | Mai | ........................ | G06F 3/045 349/12 |

* cited by examiner

*Primary Examiner* — Viet Pham
(74) *Attorney, Agent, or Firm* — Saliwanchik, Lloyd & Eisenschenk

(57) ABSTRACT

Disclosed is a touch window. The touch window includes a cover substrate; a ground electrode on the cover substrate; and a circuit substrate on the cover substrate, including a ground connecting part connected with the ground electrode and an open area to expose the ground connecting part, wherein the ground electrode is electrically connected to the ground connecting part through the open area.

12 Claims, 7 Drawing Sheets

TOUCH WINDOW

CROSS-REFERENCES TO RELATED APPLICATION

This application claims the benefit under 35 U.S.C. §119 of Korean Patent Application No. 10-2013-0111413, filed Sep. 16, 2013, which is hereby incorporated by reference in its entirety.

BACKGROUND

Technical Field

The disclosure relates to a touch window.

A touch window is installed on a display surface of an image display device such as a cathode ray tube (CRT), a liquid crystal display (LCD), a field emission display (FED), a plasma display panel (PDP), and an electro-luminescence device (ELD), so that a user inputs predetermined information into an electronic appliance by pressing the touch panel while viewing the image display device.

Due to the static electricity or ESD (Electric Static Discharge) generated from such a touch window, electrical signal interference is caused so that the accuracy of a touch is deteriorated.

BRIEF SUMMARY

The embodiment provides a touch window having the improved reliability.

A touch window according to the embodiment includes a cover substrate; a ground electrode on the cover substrate; and a circuit substrate on the cover substrate, including a ground connecting part connected with the ground electrode and an open area to expose the ground connecting part, wherein the ground electrode is electrically connected to the ground connecting part through the open area.

The ground electrode is disposed on the cover substrate included in the touch window according to the embodiment. The ground electrode prevents static electricity or ESD in the touch window. That is, the static electricity or ESD moves along a path of the ground electrode, an that the static electricity or ESD can be prevented from being introduced into the touch window. The ground electrode is disposed along the edge of the cover substrate, so that the static electricity or ESD can be effectively prevented from being introduced into the touch window. The ground electrode is connected to the circuit substrate so that the ESD in the touch window can be discharged as an electrical signal.

Thus, signal interference is prevented, so that accuracy and reliability of a touch can be improved.

DETAILED DESCRIPTION

Figure 1:
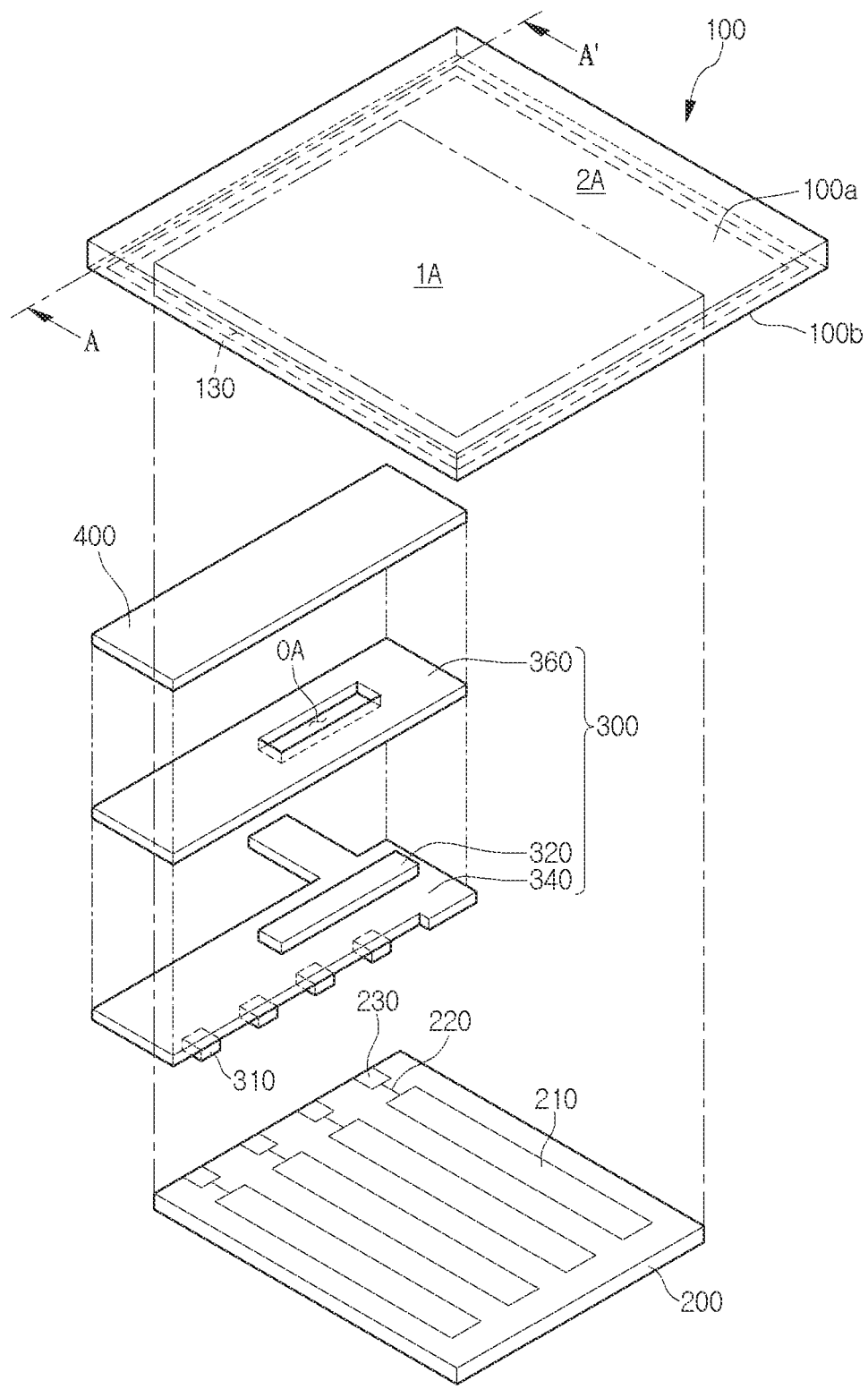
FIG. 1 is a perspective view showing an exploded touch window according to an embodiment.

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity In addition, the size of elements does not utterly reflect an actual size.

Hereinafter, an embodiment will be described in detail with reference to accompanying drawings.

Figure 2:
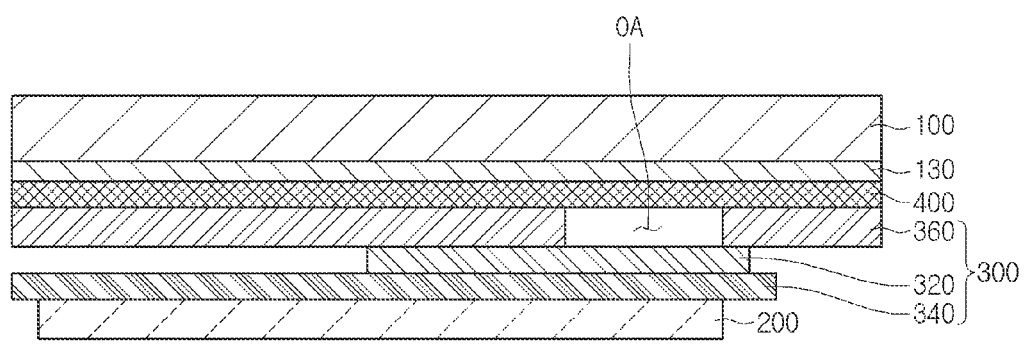
FIG. 2 is a sectional view taken along tine A-A' of FIG. 1.
Figure 3:
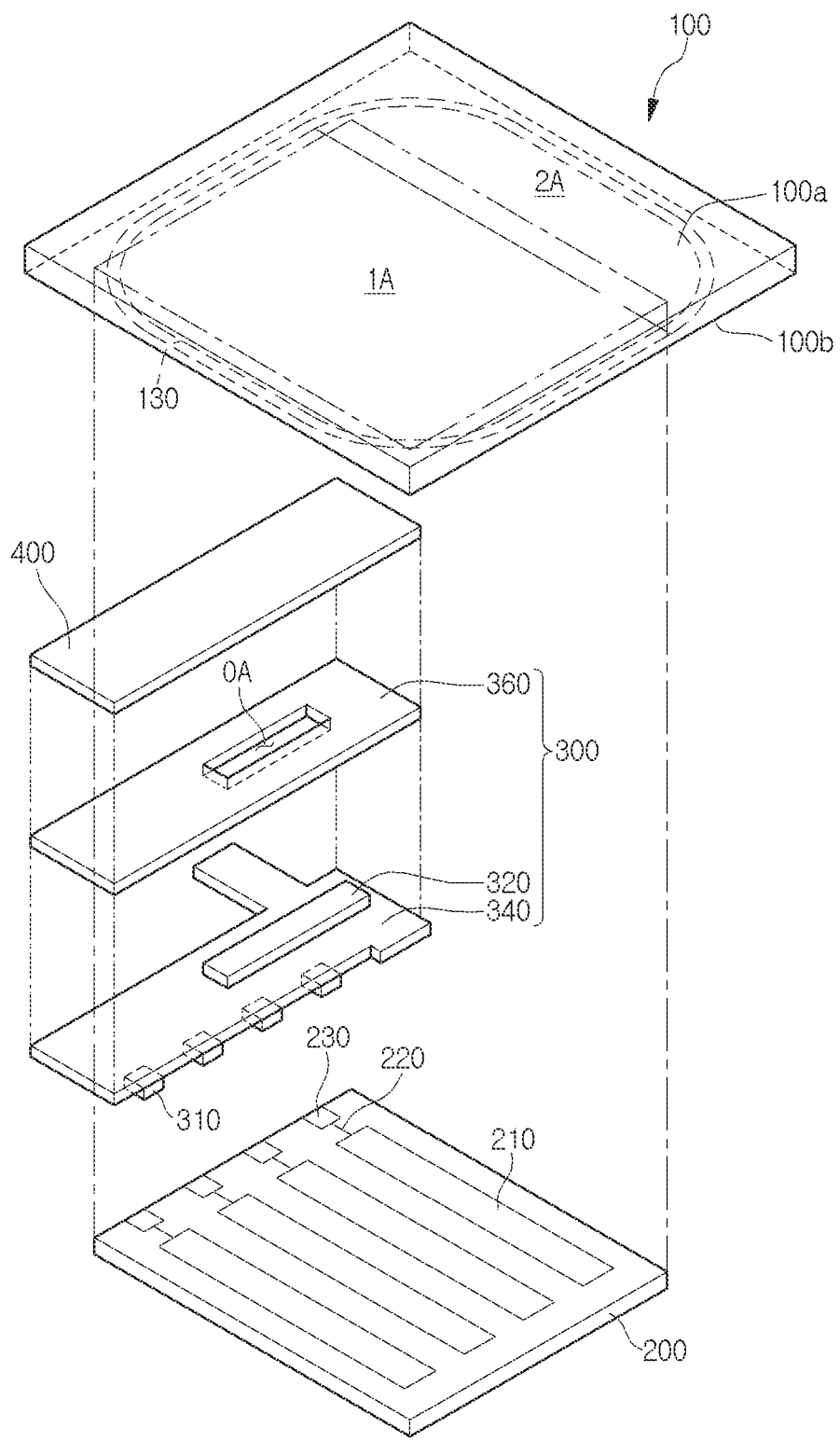
FIGS. 3 to 7 are perspective views showing exploded touch windows according to other embodiments.

First, a touch window according to an embodiment will be described in detail with reference to FIGS. 1 and 2. FIG. 1 is a perspective view showing an exploded touch window according to an embodiment. FIG. 2 is a sectional view taken along line A-A' of FIG. 1.

Referring to FIGS. 1 and 2, the touch window includes a cover substrate 100, an electrode substrate 200 and a circuit substrate 300.

The cover substrate 100 is disposed at the uppermost position of the touch window, An input device such as a finger may be touched to a top surface of the cover substrate 100. The cover substrate 100 may protect various elements disposed below the cover substrate 100. For example, the cover substrate 100 may include strengthened glass, half-strengthened glass, sodalime glass or strengthened plastic.

A first area 1A and a second area 2A surrounding the first area 1A are defined in the cover substrate 100. The first area 1A may include a display area in which a real user performs a touch instruction input.

The electrode substrate 200 may be disposed at a position corresponding to the first area 1A. That is, the electrode substrate 200 may be disposed to overlap the first area 1A. Therefore, a touch and an information input may be performed through the first area 1A.

The ground electrode 130 may be disposed in the second area 2A. In detail, the cover substrate 100 may include one surface 100a through which a real user performs a touch instruction input and the opposite surface to the one surface 100a, and the ground electrode 130 may be disposed at an edge of the opposite surface 100b. Thus, the ground electrode 130 may be disposed in the remaining area except for the area in which the electrode substrate 200 is disposed. The ground electrode 130 may be disposed such that the ground electrode 130 does not make contact with the electrode substrate 200. The ground electrode 130 may not overlap the electrode substrate 200.

The ground electrode 130 may be disposed along a border of the second area 2A. The ground electrode 130 may have various line widths to the extent that the ground electrode 130 does not overlap with the electrode substrate 200.

Meanwhile, an outer dummy layer may be formed in the second area 2A such that the ground electrode 130, a wire and a circuit substrate are not seen from an outside, The outer dummy layer may be formed by coating a material having a predetermined color. The outer dummy layer may have a color suitable for an outer appearance. For example, the outer dummy layer may include a black pigment to present a black color. The outer dummy layer may be formed through a depositing, printing or wet coating scheme. In this case, the ground electrode 130 may be disposed on the outer dummy layer.

The ground electrode 130 prevents static electricity or ESD in the touch window. That is, the static electricity or ESD moves along a path of the ground electrode 130, so that the static electricity or ESD can be prevented from being introduced into the touch window, The ground electrode 130 is disposed along the edge of the cover substrate 100, so that the static electricity or ESD can be effectively prevented from being introduced into the touch window. The ground electrode 130 may be disposed along the entire edge of the cover substrate 100. The ground electrode 130 is connected to the circuit substrate 300, so that the ESD in the touch window can be discharged as an electrical signal. Thus, signal interference is prevented, so that the accuracy and reliability of a touch can be improved, The ground electrode 130 may include metal. The ground electrode 130 may include low-resistance metal. For example, the ground electrode 130 may include silver (Ag), copper (Cu) or nickel (Ni).

Meanwhile, the ground electrode 130 may include a carbon group material. Thus, the cost may be reduced and the circuit corrosion may be prevented. Therefore, the ground electrode 130 is usable for a touch device having various use environments.

Specifically, when the ground electrode 130 includes a silver-carbon material, the ground electrode 130 may have a gray tone color. Therefore, this is useful in terms of design.

The ground electrode 130 may be formed by printing metallic paste or a carbon group material.

Meanwhile, a sensing electrode 210 and a wire 220 are disposed on the electrode substrate 200.

The sensing electrode 210 may sense an input device. Although the sensing electrode 210 is depicted in a bar shape in FIG. 1, but the embodiment is not limited thereto. Thus, the sensing electrode 210 may be formed in various shapes capable of sensing a touch of an input device such as a finger.

The sensing electrode 210 may include a transparent conductive material allowing electricity to flow therethrough without interrupting the transmission of light. To this end, the sensing electrode 210 may include various materials such as indium tin oxide, indium zinc oxide, copper oxide, carbon nano tube (CNT) or an Ag nano wire.

Although the sensing electrode 210 extending in one direction is depicted in FIG. 1, the embodiment is not limited thereto. The sensing electrode 210 may include two types of sensing electrodes, one of which extends in one direction and the other extends in another direction crossing the one direction.

If the input device such as a finger is touched on such a touch window, a difference in capacitance is caused in the portion touched by the input device, and the portion having the difference in capacitance may be detected as a touch position.

The wire 220 may be disposed on the electrode substrate 200 for the purpose of an electrical connection of the sensing electrode 210. The wire 220 may include a material having excellent electrical conductivity. For example, the wire 220 may include Cr, Ni, Cu, Al, Ag and Mo, and the alloy thereof. Specifically, the wire 220 may include various metallic paste materials which may form the wire 220 through a printing process.

A pad part 230 is disposed at an end of the wire 220. The pad part 230 may be connected to the circuit substrate 300. The pad part 230 may be connected to a connecting part 310 of the circuit substrate 300.

Various types of circuit substrates may be applied as the circuit substrate 300. For example, a flexible printed circuit board (FPCB) may be applied as the circuit substrate 300.

Although not shown in the drawings, a connector and a driving chip may be mounted on the circuit substrate 300, The circuit substrate 300 may include a top coverlay 360 and a bottom coverlay 340. The wire and ground connecting parts 310 and 320 may be formed in the circuit substrate 300. In detail, wire and ground connecting parts 310 and 320 may be formed in the bottom coverlay 340.

The wire and ground connecting parts 310 and 320 may be disposed on mutually different surfaces of the bottom coverlay 340. That is, the wire and ground connecting parts 310 and 320 may be disposed on both surfaces of the bottom coverlay 340, respectively. The wire connecting part 310 may be disposed to face the electrode substrate 200. The ground connecting part 320 may be disposed to face the cover substrate 100, The wire connecting part 310 may be connected to the wire 220. In detail, the wire connecting part 310 may be connected to the pad part 230 disposed at the end of the wire 220. Thus, the wire connecting part 310 may be electrically connected to the pad part 230 so that the wire connecting part 310 may be transferred to the pad part 230, The ground connecting part 320 may be connected to the ground electrode 130. The ground connecting part 320 may be connected to the ground electrode 130 through an adhesive layer 400 and an open area OA.

In detail, the circuit substrate 300 includes the open area OA. The open area OA is disposed at a portion of the circuit substrate 300. The open area OA is disposed in the top coverlay 360. The open area OA is disposed over the ground connecting part 320.

The ground connecting part may be exposed through the open area OA. In addition, the open area OA may expose a portion of the adhesive layer 400. Thus, the ground connecting part 320, the adhesive layer 400 and the ground electrode 130 may be connected to each other through the open area OA. In this case, the adhesive layer 400 may include a conductive material.

Although the ground connecting unit 320, the open area OA of the circuit substrate 300 and the adhesive layer 400 are depicted in FIG. 2 as spaced apart from each other, the ground connecting part 320, the adhesive layer 400 and the ground electrode 130 may really make contact with each other through the open area OA. Titus, the ground connecting part and the ground electrode 130 may be electrically connected to each other, Therefore, while the adhesive layer 400 adheres to the cover substrate 100 and the circuit substrate 300, the adhesive layer 400 may electrically connect the ground electrode 130 to the ground connecting part 320.

Hereinafter, a touch window according to another embodiment will be described with reference to FIGS. 3 to 7 In the following description about the touch window according to another embodiment, the parts similar or identical to those of the previously described embodiment will be omitted for the purpose of clear and brief description.

Referring to FIG, 3, the ground electrode 130, which is disposed on a lower surface of the cover substrate 109, may have a ring shape. That is, the ground electrode 130 may include a curved line. However, the embodiment is not limited thereto, and the ground electrode 130 may have various shapes.

Figure 4:
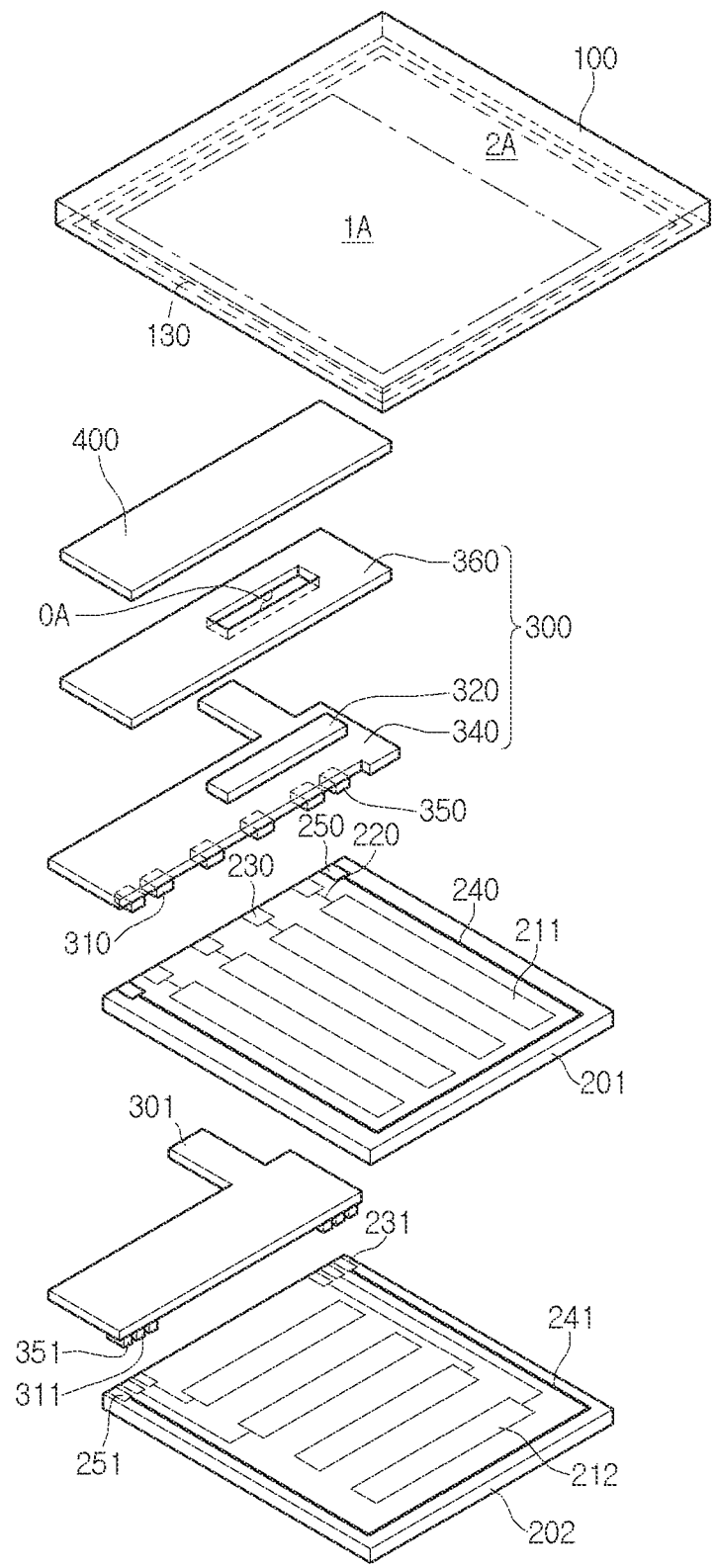

Referring to FIG. 4, a first ground electrode 130 is disposed on the lower surface of the cover substrate 100, First and second electrode substrates 201 and 202 are disposed on the lower surface of the cover substrate 100.

A first sensing electrode 211 is disposed on the first electrode substrate 201 and a second ground electrode 249 is disposed adjacently to the first sensing electrode 211. In detail, the second ground electrode 240 may be disposed at the outmost portion of the first sensing electrode 211. That is, the second ground electrode 240 may be disposed at an outer portion of the first electrode substrate 201. Meanwhile, the second ground electrode 240 may be disposed in the first area 1A which is a display area. Similarly with the first ground electrode 130, the second ground electrode 240 prevents static electricity or ESD in the touch window. in addition, the second ground electrode 249 may prevent signal interference of the first sensing electrodes 211.

The second ground electrode 240 may be disposed to surround an outer portion of the first electrode substrate 201. However, differently from those depicted in the drawings, when long and short sides of the first electrode substrate 201 are defined, the second ground electrode 240 may extend along the long side of the first electrode substrate 201. That is, the first ground electrode 130 may extend in the same direction as the first sensing electrode 211.

A pad part 250 may be disposed at an end of the second ground electrode 240, so that the pad part 250 may be connected to a connecting part 350 of the circuit substrate 300.

Meanwhile, the second electrode substrate 202 may be disposed on a lower surface of the first electrode substrate 201. In addition, a second sensing electrode 212 is disposed on the second electrode substrate 202 and a third ground electrode 241 is disposed adjacently to the second sensing electrode 212. In detail, the third ground electrode 241 may be disposed at the outmost portion of the second sensing electrode 212. That is, the third ground electrode 241 may be disposed at an outer portion of the second electrode substrate 202. Similarly with the first ground electrode 130, the third ground electrode 241 also prevents static electricity or ESD in the touch window. in addition, the third ground electrode 241 may prevent signal interference of the second sensing electrodes 212.

The third ground electrode 241 may be disposed to surround an outer portion of the second electrode substrate 202. However, differently from those depicted in the drawings, when long and short sides of the second electrode substrate 202 are defined, the third ground electrode 241 may extend along the long side of the second electrode substrate 202. The first ground electrode 130 may extend in a direction crossing the extension direction of the second sensing electrode 212.

A pad part 251 may he disposed at an end of the third ground electrode 241, so that the pad part 251 may be connected to a connecting part 351 of the second circuit substrate 301.

Figure 5:
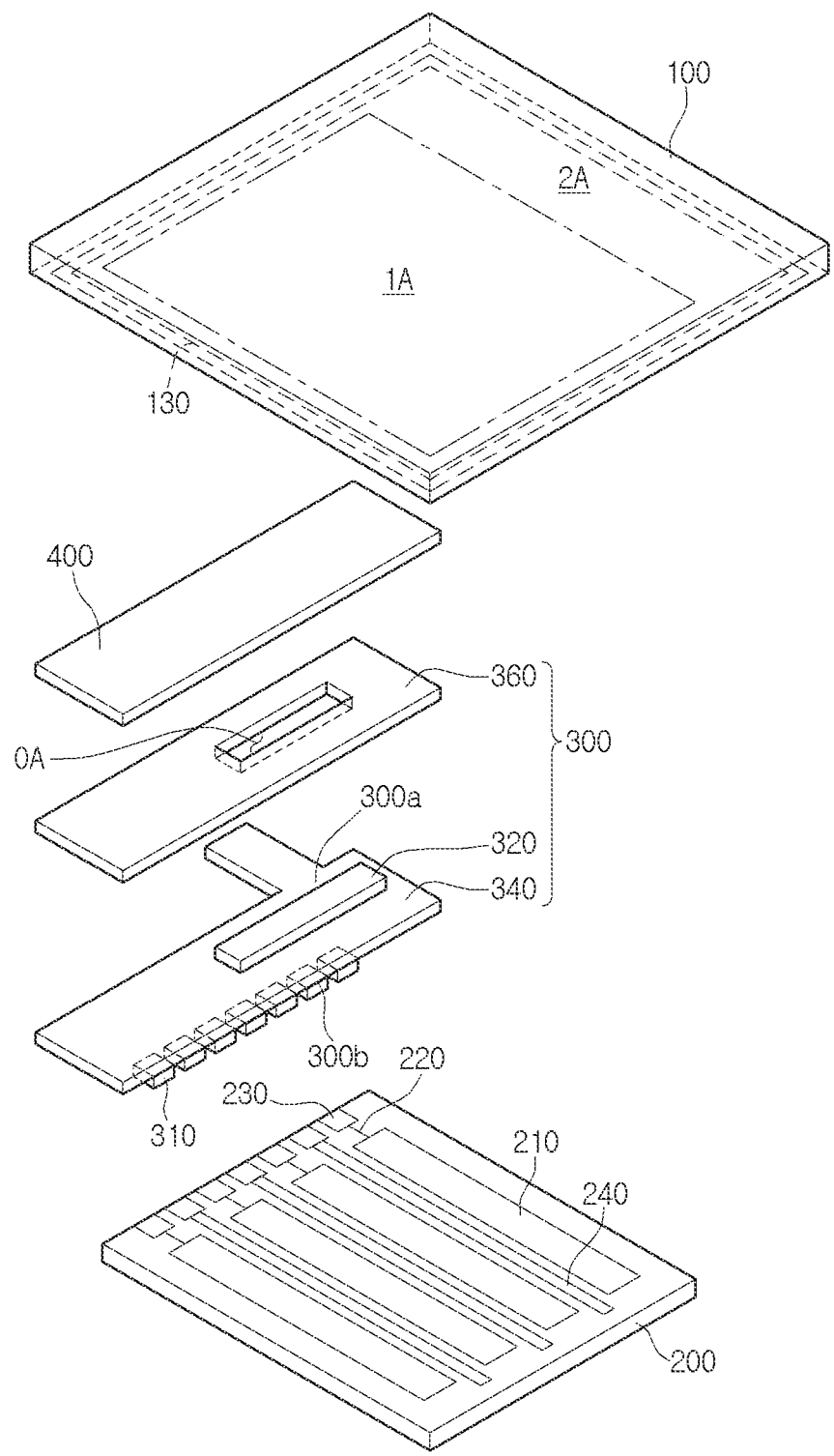

Next, referring to FIG. 5, sensing electrodes 210 may be disposed on the electrode substrate 200 and second ground electrodes 240 may be interposed between the sensing electrodes 210. In this case, the second ground electrodes 240 may be transparently formed. Thus, the second ground electrodes 240 may he prevented from being seen in the first area IA which is a display area. In addition, a width of a bezel may be reduced, so that a wider display area may be achieved, thereby overcoming a limitation in terms of design.

Figure 6:
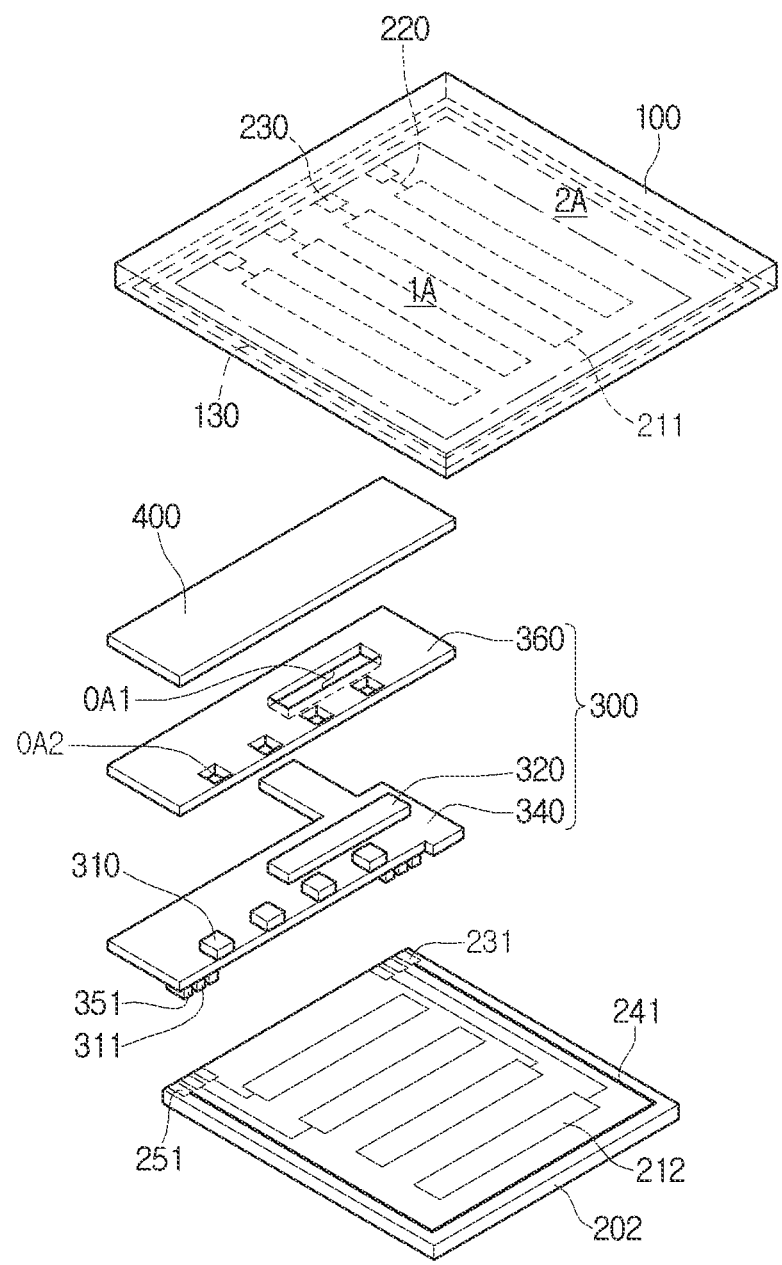

Referring to FIG. 6, the first sensing electrode 211 may be formed directly on the lower surface of the cover substrate 100. Thus, an electrode substrate for forming the first sensing electrode 211 may be omitted, so that the thickness of the touch window may be reduced.

In this case, the top coverlay 360 may include the first and second open areas OA1 and OA2.

The ground connecting part 320 and the wire connecting part 310 may be disposed on the same plane on the bottom coverlay 360. Meanwhile, the second wire connecting part 311 may be disposed on an opposite surface of the bottom coverlay 360. The second wire connecting part 311 may face the second electrode substrate 202.

The first open area OA1 may expose the ground connecting part 320. Thus, the ground connecting part. 320 and the ground electrode 130 may be connected to each other.

Figure 7:
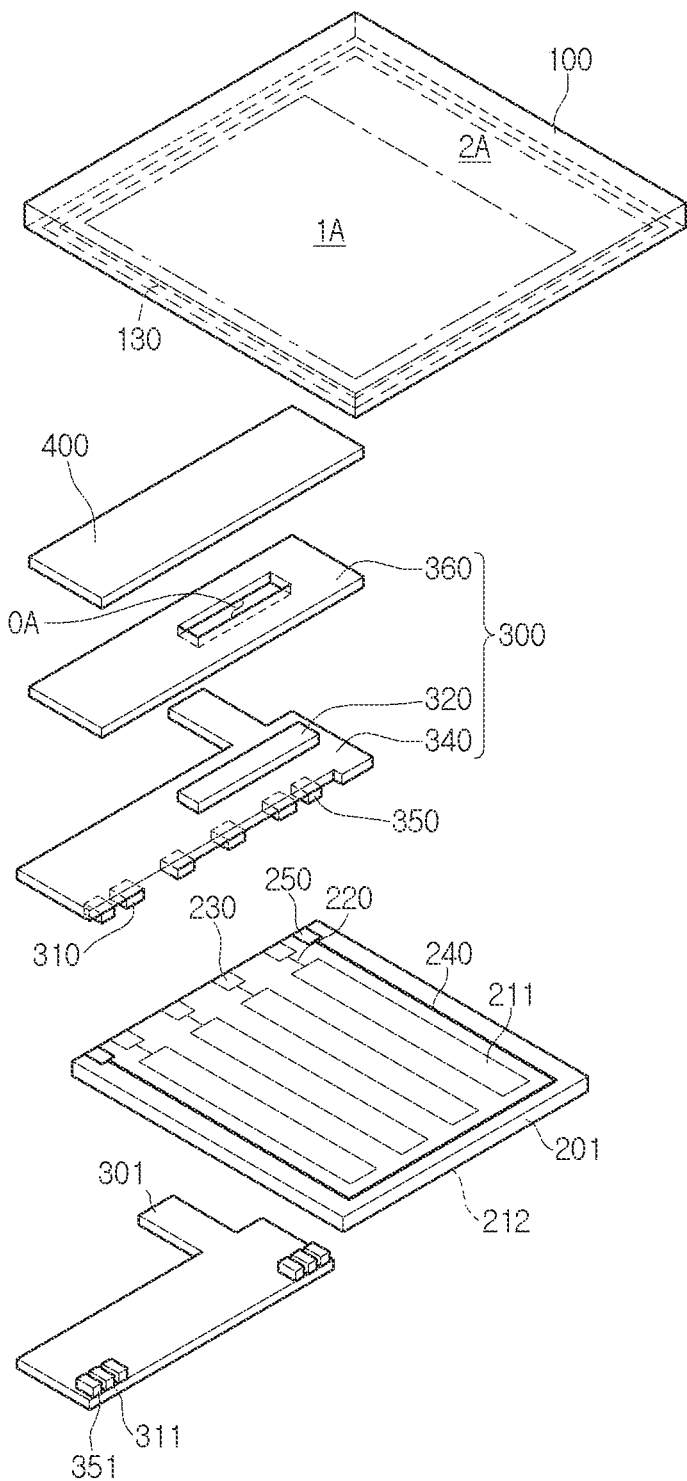

The second open area OA2 may expose the wire connecting part 310. Thus, the wire connecting part 310 and the pad part 230 may be connected to each other. Referring to FIG. 7, the first sensing electrode 211 may he disposed on an upper surface of the electrode substrate 201 and the second sensing electrode 212 may he disposed on a lower surface of the electrode substrate 200. Thus, the sensing electrodes 211 and 212 may be formed on a single electrode substrate, so that the thickness of the touch window may be reduced.

Such a touch window may be disposed on a display panel which is a driving part. The touch window and the display panel may be combined with each other so that a touch device may be produced.

The touch window may be applied to a vehicle as well as a touch device of a mobile terminal. That is, the touch window is applied to a dashboard as well as a PND (Personal Navigation Display) such as a vehicle navigation, so that a CID (Center Information Display) may be implemented. However, the embodiment is not limited to the above, and the touch device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a cover substrate;
   a ground electrode on the cover substrate;
   a circuit substrate on the cover substrate, including a ground connecting part connected with the ground electrode and an open area to expose the ground connecting part;
   an electrode substrate on the cover substrate, the electrode substrate including a sensing electrode to sense a position and a wire to electrically connect the sensing electrode; and
   a wire connecting part connected to the wire;
   wherein the ground electrode is electrically connected to the ground connecting part through the open area;

wherein the circuit substrate includes a bottom coverlay on which the ground connecting part and the wire connecting part are disposed, and a top coverlay disposed on the bottom coverlay; and wherein the ground connecting part and the wire connecting part are disposed on both surfaces of the bottom coverlay, respectively.

2. The touch window of claim 1, wherein the open area is provided in the top coverlay.

3. The touch window of claim 1, further comprising an adhesive layer between the cover substrate and the circuit substrate.

4. The touch window of claim 3, wherein the adhesive layer has conductivity.

5. The touch window of claim 3, wherein the adhesive layer electrically connects the ground electrode to the ground connecting part.

6. The touch window of claim 1, further comprising a second ground electrode adjacent to the sensing electrode.

7. The touch window of claim 6, wherein the sensing electrode and the second ground electrode are disposed on a same plane.

8. The touch window of claim 1, wherein the sensing electrode includes a first sensing electrode and a second sensing electrode.

9. The touch window of claim 8, wherein the electrode substrate includes a first electrode substrate and a second electrode substrate, the first electrode is disposed on the first electrode substrate, and the second sensing electrode is disposed on the second electrode substrate.

10. The touch window of claim 8, wherein the first sensing electrode is disposed on the cover substrate, and the second sensing electrode is disposed on the electrode substrate.

11. The touch window of claim 8, wherein the first and second sensing electrodes are disposed on both surfaces of the electrode substrate.

12. A touch device comprising:

a display panel; and a touch window on the display panel, wherein the touch window comprises:

a cover substrate;

a ground electrode on the cover substrate;

a circuit substrate on the cover substrate, including a ground connecting part connected with the ground electrode and an open area to expose the ground connecting part;

an electrode substrate on the cover substrate, the electrode substrate including a sensing electrode to sense a position and a wire to electrically connect the sensing electrode; and a wire connecting part connected to the wire;

wherein the ground electrode is electrically connected to the ground connecting part through the open area;

wherein the circuit substrate includes a bottom coverlay on which the ground connecting part and the wire connecting part are disposed, and a top coverlay disposed on the bottom coverlay; and wherein the ground connecting art and the wire connecting art are disposed on both surfaces of the bottom coverlay, respectively.

* * * * *